June 4, 1968      B. W. PRESTON      3,386,333
HEADLAMP AIMING

Filed Dec. 28, 1964      3 Sheets-Sheet 1

$$C = \frac{I_S}{I_I - I_B}$$

BRUCE W. PRESTON
INVENTOR.

BY John R. Faulkner
Keith L. Zerschling
ATTORNEYS

June 4, 1968  B. W. PRESTON  3,386,333
HEADLAMP AIMING

Filed Dec. 28, 1964  3 Sheets-Sheet 3

BRUCE W. PRESTON
INVENTOR.

BY John R. Faulkner
Keith L. Zerschling
ATTORNEYS

United States Patent Office 3,386,333
Patented June 4, 1968

3,386,333
HEADLAMP AIMING
Bruce W. Preston, Dearborn, Mich., assignor to The Ford Motor Company, Dearborn, Mich., a corporation of Delaware
Filed Dec. 28, 1964, Ser. No. 421,421
10 Claims. (Cl. 88—14)

This invention relates to the proper aiming of the low-beam or city driving lamps of an automotive vehicle, and more particularly to a method and apparatus for quickly and accurately aiming these lamps as the vehicle comes off the production line.

The basic regulatory code used by most state, federal, and local regulating agencies is that described as the Lighting Inspection Code—SAE J599a: SAE Recommended Practice, which appears on pages 735–737 of the Society of Automotive Engineers 1964 SAE Handbook. With respect to the aiming of the low-beam or city driving lamps of the automotive vehicle, it states that beams should be inspected for aim either (1) on a screen at a distance 25′ ahead of the headlamps, or (2) with inspection equipment which gives essentially equivalent results, or (3) with a mechanical headlamp aimer which can be used with mechanically aimable headlamps.

If a screen is to be used, it must be of adequate size and spaced at a distance of 25′ from the lamp to be aimed. The light pattern projected from the lamp is viewed on this aiming screen which has target lines marked on its surface for use in visual evaluations of the aiming. The code described above states that for vertical aim of the low beam, the top edge of the high intensity zone shall be located along a horizontal centerline located at the level of the lamp center within limits of plus or minus 2″. For lateral or horizontal aiming, the left edge of the high intensity zone shall be located 2″ to the right of the vertical centerline located straight ahead of the lamp center within limits of 4″ to the right and 2″ to the left of the desired position. Each projected light pattern must be examined visually by the operator and the position of the high intensity zone relative to the aiming target lines on the screen must be evaluated and adjusted to provide proper aiming in the judgment of the operator.

An alternate means for inspecting for low-beam aim may be with a mechanical headlamp aimer which can be used with mechanically aimable headlamps. This mechanical headlamp aimer must comply with the code mentioned above, and it ordinarily includes devices that rest against three aiming pads on the headlamp face lens. The system depends generally upon bubble level indicators or other mechanical means to indicate proper headlamp adjustment. This method of aiming the low beams is highly dependent upon a very precise relationship between the position of the aiming pads and the projected light pattern. It is seldom used because of the inherent variations and difficulties in maintaining this very precise relationship.

Automotive and truck headlamps are usually aimed in assembly plants by visually examining the light pattern projected on a target board aiming screen at the required distance of 25′, and adjusting these lamps by manual means to conform to the Society of Automotive Engineers Recommended Practice as brought out above. A few assembly plant, however, do use the mechanical aiming devices described above. As is evidenced by the large use of the visual based system, it appears that this system is superior to the mechanical aiming by mechanical aiming devices. The visual system, however, is not without its problems. The primary difficulties are due to the variations in the operator's interpretation of the position of the top and left edges of the high intensity zone relative to the horizontal and vertical aiming target lines on the screen. Added to this are the inherent problems of operator fatigue, attitude, visual acuity and other human frailties. Even under the best conditions, variations in the quality of the aiming of the headlamps by the visual system do exist.

It is apparent, therefore, that there is a need for a new system for aiming headlamps that will eliminate or minimize the variations described above and that will eliminate or substantially reduce the disadvantages that are inherent in both the visually based system and the mechanical system described above. It is essential that such a sytem be capable of accurately and consistently interpreting the positions of the high intensity zone of the projected light pattern from the low-beam headlamp. It must indicate the direction of adjustment necessary for proper alignment and must indicate when proper adjustment has been achieved.

In the present invention, means are provided for properly aiming the light pattern of a low-beam headlamp by properly determining and locating the edge of the high intensity zone of the low-beam light pattern on a headlamp aiming screen or target board. The basic difficulty in determining this edge instrumentally has been caused by the general tendency of this area (i.e. the edge) to be gradient in character rather than the less complex situation consisting of immediately adjacent illuminated and non-illuminated areas. Further, the general character of this gradation in light intensities varies considerably between individual lamps and lamps of different manufacture. Regardless of these variations, if the conditions are suitable it is possible for an experienced person to visually judge the location of this edge in a reasonably consistent manner.

It should be noted also that certain variations exist among the judgments of observers in discerning the edge of the high intensity zone. Such judgments are based on the contrast in intensities observed in immediately adjacent areas of the projected light pattern. Such judgments of contrast can be approximately represented by mathematical ratios of these intensities. It should be particularly noted, however, that such visual judgments also take into consideration the background or ambient light and automatically compensate for this within limits. In the invention, the inventor has simulated those physiological processes which take place when a headlamp aim operator visually determines the edge of the light pattern as projected by the low-beam lamps of an automotive vehicle.

The present invention is considered fully capable of determining the edge of the light pattern and of simulating the physiological processes which take place when a headlamp aim operator visually determines this edge. As a result, the present invention is considered fully capable of accurately and rapidly aiming the low-beam headlamps of an automotive vehicle while substantially eliminating or reducing the disadvantages and inherent inaccuracies of the various other systems described above.

In the invention, three light sensitive devices or photoreceptors are positioned on a headlamp aiming screen or target board along a horizontal line that may be located for example, 7″ below the projected horizontal centerline of the low-beam headlamp to be aimed. The spacing of these light sensitive devices or photoreceptors may be such that the first is located 2″ to the right of the vertical centerline of the lamp, the second is located 4″ to the right of the first, and the third is located 2″ to the right of the second.

A similar set of three light sensitive devices or photoreceptors is positioned on the target board on a vertical line that may be, for example, positioned 9″ to the right of the projected vertical centerline of the low-beam headlamp to be aimed. The first of the light sensitive devices or photoreceptors is positioned on the horizontal centerline of the lamp, while the second is located 2″ below the first and the third is located 1″ below the second.

It can readily be appreciated when the position of these light sensitive devices or photoreceptors is considered in connection with the properly aimed position of the edges of the high intensity zone cast by the low-beam headlamp, that the first of the light sensitive devices or photoreceptors in both the horizontal and vertical sets is located at the position of the edge of the high intensity zone for the low-beam headlamps as required by the lighting inspection code. The second and third light sensitive devices or photoreceptors of both of these sets are located inside the high intensity zone of a properly aimed low-beam headlamp. In both sets, the first light sensitive device or photoreceptor receives light representative of the base, background or ambient light intensity. The second receives light representative of a lower light intensity found in the high intensity zone, and the third receives light representative of the superior or higher light intensity found in the high intensity zone.

It was found based upon observation and subsequent verification, that the following equation can be used to represent that physiological phenomenon which occures in conventional visual and manual aiming of the low-beam headlamp of an automotive vehicle:

$$C = \frac{I_s}{I_I - I_B}$$

Where C represents a quantity that may be defined as the objective contrast factor; $I_S$ represents the intensity of the light received by the third light sensitive device or photoreceptor, the superior or higher light intensity, found in the high intensity zone; $I_I$ represents the intensity of the light falling on the second of the light sensitive devices or photoreceptors and is representative of the inferior or lower light intensity found in the high intensity zone, and $I_B$ represents the base or background light intensity that is received by the first light sensitive device or photoreceptor. Experience has shown that when a low-beam headlamp is aimed properly in both the horizontal and vertical directions, that the objective contrast factor, C, is a minimum for both directions.

In the system of the invention, the three light sensitive devices or photoreceptors of the horizontal set are connected to a horizontal contrast computer amplifier, and the three light sensitive devices or photoreceptors of the vertical set are connected to a vertical contrast computer amplifier that compute the value of the objective contrast factors, C, mentioned in the above equation for both the horizontal and vertical aiming of the low-beam headlamp. Horizontal and vertical aim indicator meters may be connected to the horizontal contrast computer amplifier and the vertical contrast computer amplifier respectively. As the operator adjusts the low-beam headlamps in the vehicle to scan the respective horizontal and vertical sets of light sensitive devices or photoreceptors, the proper aiming of the headlamps will be indicated when both the horizontal aim indicating meter and the vertical aim indicator meter indicate a minimum value.

In addition, or as an alternate means of adjustment, servo units may be employed to automatically adjust the high intensity zone of a low-beam headlamp into a proper position. In order to do this, horizontal and vertical minimum voltage detectors are connected to the horizontal contrast computer amplifier and the vertical contrast computer amplifier respectively. A horizontal voltage comparator and a vertical voltage comparator are connected to the horizontal minimum voltage detector and the vertical minimum voltage detector respectively.

The servo units include means for automatically driving the adjusting screws of the headlamp so that the light pattern is scanned from one extreme position, for example, to the left of the properly aimed position to another extreme position, for example, to the right of the properly aimed position across the horizontal set of light sensitive devices or photoreceptors. As this happens, the horizontal minimum voltage detector will pick up the minimum value of the contrast factor, C, and this will be stored in the horizontal voltage comparator. The servo unit will then stop and reverse so that the low-beam light pattern is brought back toward its original position. When it returns to a point where the contrast factor, C, is again a minimum, as stored in a horizontal voltage comparator, the servo unit will stop and the high intensity zone of the low-beam headlamps will be in the proper horizontal or lateral position.

The above system could also be used with a manual screw driver rather than a servo unit and with a lamp that will automatically light when the low-beam headlamp has been adjusted so that the contrast factor, C, is again a minimum after a first total scan from the extreme left to the extreme right positions.

The same apparatus and procedure may be applied to the adjustment of the vertical positioning of the high intensity zone of the low-beam headlamp with the difference, of course, that the scanning or movement of the light pattern takes place in a vertical direction.

Computations based upon experimental data indicate that the system gives results equivalent to visual aiming and could be used successfully in production plants to aim the low-beam headlamps of vehicles as they come off the production line.

An object of the present invention is the provision of an apparatus and method for aiming of the low-beam headlamps of an automotive vehicle that is fast in operation and that eliminates the disadvantages inherent in the visual method of the aiming of headlamps.

Another object of the invention is the provision of a method and system for aiming low-beam headlamps of an automotive vehicle which is very rapid and accurate, and will substantially eliminate any incorrect aiming due to aiming inaccuracies of the headlamps by operators using the visual method.

A further object of the invention is the provision of a system and method for accurately aiming the low-beam headlamps of an automotive vehicle that simulates the physiological process used in the visual aiming of headlamps.

Other objects and attendant advantages of the present invention will be more readily apparent as the specification is considered in connection with the attached drawings in which:

FIGURE 1 is a schematic view of an automotive vehicle shown in proper position in relation to a vehicle headlamp aiming board;

FIGURE 2 discloses the high intensity zone of one low-beam headlamp properly positioned on a vehicle headlamp aiming board with respect to projected horizontal and vertical lines through the centerline of the low-beam headlamp;

The invention will be described and is illustrated in relation to a four-lamp headlight system in which 5¾″ type 2 sealed beam headlamps are used for providing the low-beam light pattern or illumination when the vehicle operator has his dimmer switch positioned for low-beam operation. It is to be understood, however, that this system is equally applicable to headlamp systems for automotive vehicles which employ two headlamps only. In the latter system, a 7" sealed beam headlamp is used that employs a pair of filaments, one of which is energized when the lamp is switched to its low-beam position. It should be understood also that although the system is illustrated with horizontally arranged double headlamps on either side of the vehicle, that it may be equally employed with vertically arranged headlamps positioned on either side of the vehicle. Also, the spacing of the light sensitive devices or photoreceptors may be adjusted to suit various vehicles. The spacing described in this specification is that which was found to be satisfactory for a given vehicle.

Figure 1:
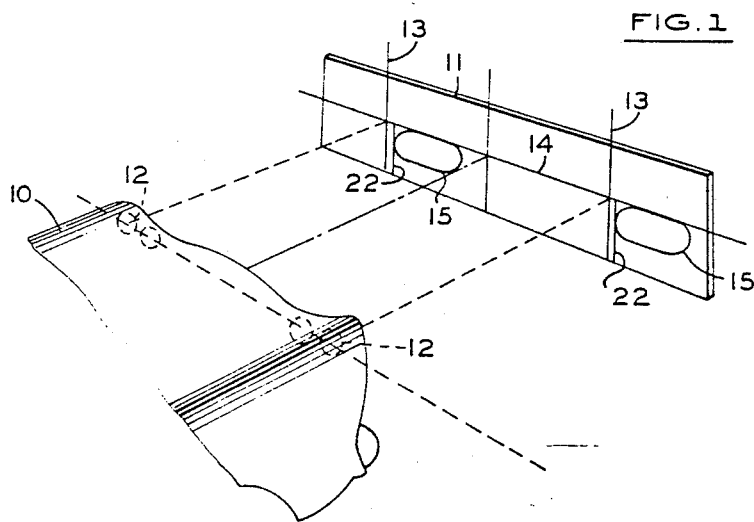

Referring now to the drawings in which like reference numerals designate like parts throughout the several views thereof, there is shown in FIGURE 1 an automotive vehicle 10 positioned properly before a headlamp aiming screen or target board 11. As previously pointed out, the distance between the headlamps to be aimed and the headlamp aiming screen or target board is 25'. The low-beam headlamps of the headlamp system to be properly aimed as shown here, are the outboard lamps 12 on either side of the vehicle. As shown on the headlamp aiming screen or target board 11, a vertical line 13 is positioned on the headlamp aiming screen or target board 11 on each side thereof which is a projection of a vertical line through the centerline of each of the lamps 12. A horizontal line 14 is also positioned on the headlamp aiming screen or target board 11, and this line is a projection of the horizontal centerline through the center of the lamps 12.

Figure 2:
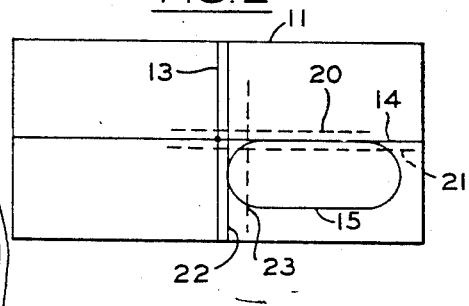

Turning now to FIGURE 2 which discloses one-half of the headlamp aiming screen or target board 11, the standards for aiming a low-beam headlamp 12 will be discussed. It is to be understood that the discussion relative to FIGURE 2 applies equally to the low-beam headlamp 12 located on the right-hand side of the vehicle and the low-beam headlamp 12 located on the left-hand side of the vehicle. The high intensity zone of the low-beam headlamp 12 is indicated by the generally oblong pattern 15. The SAE standards mentioned above state that the upper edge of the high intensity zone should be located on the horizontal line 14 which represents the level of the center of the lamp 12. The aiming of the low-beam headlamp in a vertical direction is unsatisfactory if the edge of this high intensity zone is more than 2" above the horizontal centerline 14 or more than 2" below it as indicated by the dashed lines 20 and 21.

In the lateral aiming of the low-beam headlamp 12, the left edge of the high intensity zone 15 should be located on a vertical line 22 located 2" to the right of the vertical line 13 which is a projection of a vertical line through the center of the lamp 12. Aiming is unsatisfactory if this edge is more than 4" to the right of the vertical line 22 as represented by the dashed line 23 or more than 2" to the left of the vertical line 22 which would be at the position of the projected vertical centerline of the lamp 12 as represented by the vertical line 13.

Figure 3:
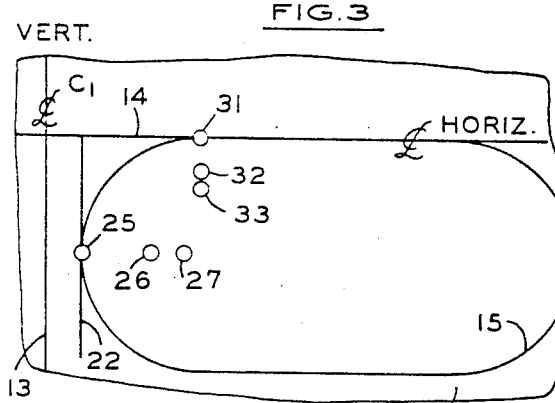
FIGURE 3 shows the position of the horizontal and vertical sets of light sensitive devices or photoreceptors of the present invention when mounted on the headlamp aiming board shown in FIGURES 1 and 2 and in relation to the high intensity zone of the low-beam headlamp.

Referring now to FIGURE 3, there is shown a first group of three light sensitive transducers or photoreceptors 25, 26 and 27, positioned on a horizontal line parallel to the projected horizontal centerline of the lamps 12 as represented by the line 14. These photoreceptors or light sensitive transducers are positioned, as shown in the drawing, for a particular type vehicle, for example, a 1964 Ford Galaxie. The positions may be adjusted to suit the lighting arrangements on other vehicles. For the 1964 Ford Galaxie, the first transducer 25 is positioned on the line 22 or 2" to the right of the projected vertical centerline 13 of the lamp 12. It is also located 7" below the projected horizontal centerline 14 of the lamp 12. The photoreceptor or light sensitive transducer 26 is positioned 4" to the right of photoreceptor or light sensitive transducer 25, and the light sensitive transducer or photoreceptor 27 is positioned 2" to the right of the light sensitive photoreceptor or transducer 26.

Three additional photoreceptors or light sensitive transducers 31, 32 and 33 are positioned on a vertical line located 7" to the right of the vertical line 22, and hence 9" to the right of the vertical line 13 through the centerline of the low-beam headlamps 12. The first photoreceptor or light sensitive transducer 31 is positioned on the horizontal centerline 14. The second light sensitive transducer 32 is positioned 2" below the first light sensitive transducer 31, and the third light sensitive transducer 33 is positioned 1" below the second light sensitive transducer 32.

Figure 4:
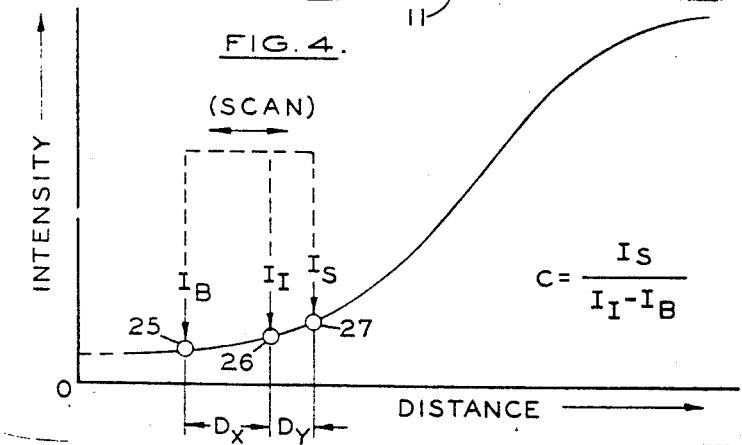
FIGURE 4 shows a distribution of the light intensity with respect to distance scanned in either a horizontal or vertical direction along the position of the vertical and horizontal sets of light sensitive devices or photoreceptors shown in FIGURE 3.

Referring now to FIGURE 4 which is a plot of the light intensity versus horizontal distance starting to the left of the high intensity zone 15, for example, to the left of vertical centerline 13 into the highest intensity portion of the high intensity zone 15, the location of the horizontal light sensitive transducers or photoreceptors 25, 26 and 27 can be seen relative to the light distribution curve of a properly aimed low-beam headlamp. The light intensity received by the phototransducer 25 is denoted by $I_B$, the light intensity received by the photoreceptor 26 is denoted $I_I$, and the light received by the phototransducer 27 is denoted $I_s$. It can be readily appreciated that the three photoreceptors or light sensitive transducers 25, 26 and 27 are fixed on the lamp aiming board or target screen 11 as described in relation to FIGURE 3 and that the light intensity distribution curve shown is shifted horizontally as horizontal adjustment of the low-beam headlamp is made.

As previously mentioned, it has been found that for certain vehicles, for example, the 1964 Ford Galaxie, the distance $D_x$ should be 4" and $D_y$ should be 2" for horizontal or lateral headlamp aiming, while $D_x$ and $D_y$ should be 2" and 1" respectively for vertical aiming or adjustment of the low-beam headlamp.

As previously stated, it was found that when the following equation is a minimum for both horizontal and vertical aiming that the low beam is properly aimed:

$$C=\frac{I_s}{I_I-I_B}$$

Figure 5:
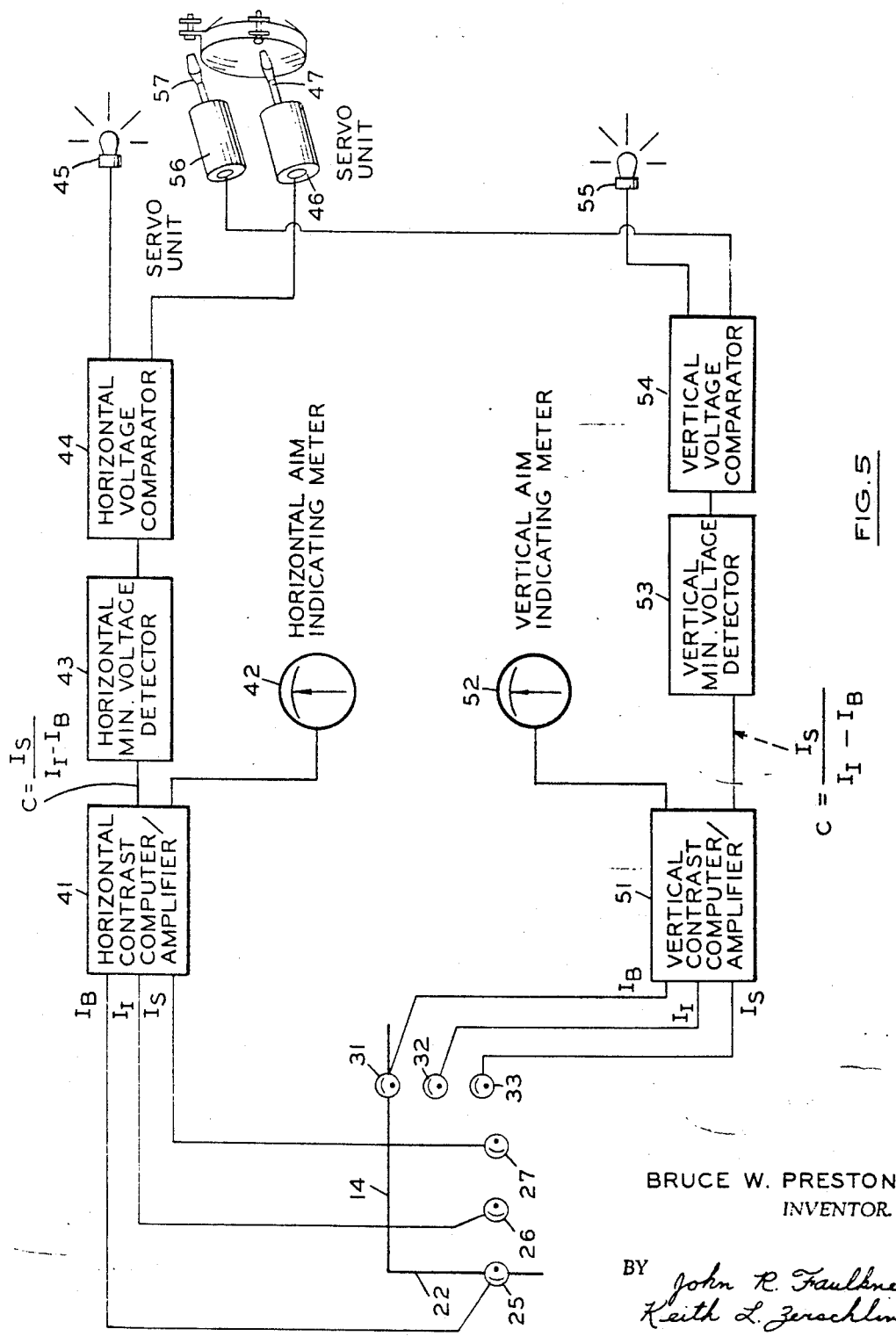
FIGURE 5 is a block diagram or schematic of the apparatus of the present invention employed for properly aiming the low-beam headlamps of an automotive vehicle.

In order to provide a means for properly computing this ratio and indicating to the vehicle headlamp adjuster that the objective contrast factor, C, is a minimum, the invention shown in FIGURE 5 has been invented by the inventor. The outputs from the three horizontal light sensitive transducers or photoreceptors 25, 26 and 27 are connected to a horizontal contrast computer amplifier 41 which computes the contrast factor, C, from the values $I_B$, $I_I$ and $I_s$, that represent the intensities of the outputs from the light sensitive transducers or photoreceptors 25, 26 and 27 respectively. The horizontal contrast computer amplifier 41 may be connected to a horizontal aim indicating meter 42 which indicates the minimum value of the contrast factor, C, when achieved.

Thus, if the headlamp aiming operator wishes to manually adjust the headlamps as described subsequently, he may do so by use of a manually operated screw driver on an adjusting screw. He may move the horizontal aim indicating meter into the minimum position thus indicating a minimum value of the contrast factor, C, and proper aiming in a horizontal or lateral direction of the high intensity zone 15 of the low-beam headlamp 12 in which the left edge of the high intensity zone is positioned on the line 22.

Means may be provided also to indicate in an additional way the proper aiming of the high intensity zone 15 in a horizontal direction and means may also be provided for automatically aiming the headlamp. In order to do this, a horizontal minimum voltage detector 43 is connected to the horizontal contrast computer amplifier 41 and a horizontal voltage comparator 44 is connected to this horizontal minimum voltage detector. The horizontal voltage comparator 44 may be connected to an incandescent lamp 45 and may be also connected to a servo unit 46 having a rortatable shaft to which is connected a screw driver or other adjusting tool 47.

Similarly, the vertical photoreceptors or light sensitive transducers 31, 32 and 33 are connected to a vertical contrast computer amplifier 51 that computes the contrast factor, C, for the vertical adjustment of the high intensity zone 15 of the low-beam headlamp 12. The vertical contrast computer amplifier may be connected to a vertical aim indicator meter 52 and may also be connected to a vertical minimum voltage detector 53. The output of the vertical minimum voltage detector 53 may be connected to a vertical voltage comparator 54 and the output of the vertical voltage comparator 54 may be connected to a lamp 55 and/or to a servo unit 56 which has a rotatable shaft to which is connected a suitable adjusting tool, for example, a screw driver 57 may be connected.

Figure 6:
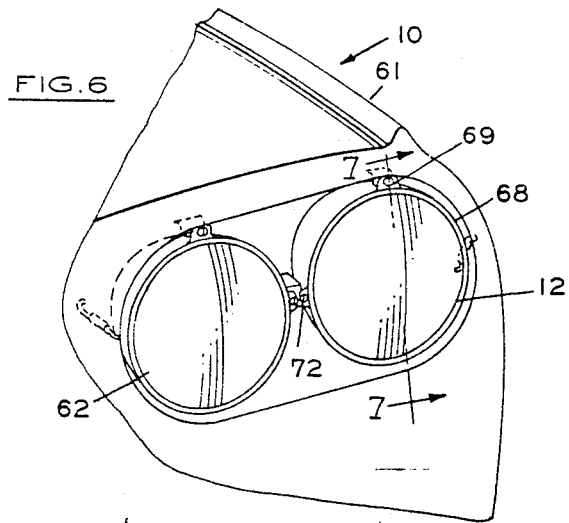
FIGURE 6 is a front elevational view of one side of the vehicle using a four headlamp system.
Figure 7:
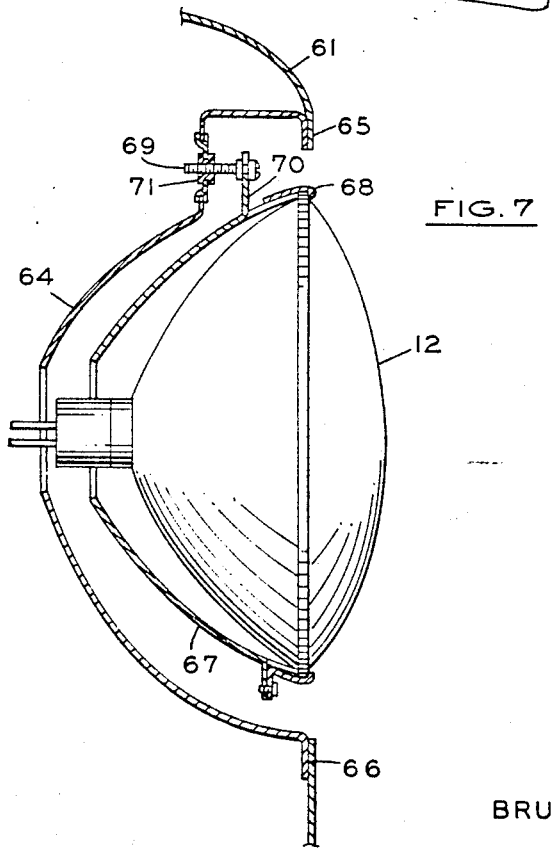
FIGURE 7 is a sectional view through the low-beam headlamp taken along the lines 7—7 of FIGURE 6 showing the adjusting mechanism for this headlamp.

FIGURE 6 shows a fender 61 of an automotive vehicle that has mounted therein the low-beam headlamp 12 and a high-beam headlamp 62. Since this invention is concerned with the aiming of the low-beam headlamp 12 only, the description of the invention will be confined to that headlamp. A section of this headlamp is shown in FIGURE 7 taken along the lines 7—7 of FIGURE 6, and this shows the fender 61 having a lamp enclosing mounting structure 64 suitably affixed thereto at 65 and 66. The headlamp 12 has a frame 67 positioned at the rear of the lamp that grips the outer flange of the lamp at 68. A vertical adjusting screw extends through the frame 67 at 70 and engages a nylon nut member 71 mounted in the mounting structure 64. The horizontal adjusting screw 72 shown in FIGURE 6 also has the same construction. This is a standard lamp adjusting structure that need not be described in greater detail. Suffice it to say that when the adjusting screw 69 is rotated, the low-beam headlamp high intensity zone represented by the pattern 15 may be adjusted vertically on the headlamp aiming screen or target board 11, and when the horizontal adjusting screw 72, as shown, is rotated the low-beam intensity pattern 15 may be shifted laterally or horizontally on the headlamp aiming screen or target board 11.

When the automotive vehicle in which the low-beam headlamp 12 has been mounted comes off the assembly line, it is driven into the position shown in FIGURE 1 at the requisite 25' distance from the headlamp aiming screen or board 11. The headlamp aiming operator then makes a rough adjustment of the adjusting screws 69 and 72 to bring the low-beam high intensity zone represented by the pattern 15 into the general area of the photoreceptors or light sensitive transducers 25 through 27 and 31 through 33.

The headlamp aiming operator may then properly adjust the low-beam high intensity zone by rotating the adjusting screws 69 and 72 so that both the horizontal aim indicating meter 42 and the vertical aim indicating meter 52 register a minimum. In order to do this it is necessary for him to turn the adjusting screws 69 and 72 so that the high intensity zone 15 of the light pattern from the low-beam headlamp scans the three horizontal and the three vertical light sensitive transducers or photoreceptors 25, 26 and 27 and 31, 32 and 33. When both the horizontal and vertical aim indicating meters register a minimum, the high intensity zone 15 of the low-beam headlamp will be properly aimed since the contrast factors, C, will be a minimum for both the vertical and horizontal position of the edges of the high intensity zone 15 of the low-beam headlamp 12.

In the alternative, the vertical and horizontal minimum voltage detectors 43 and 53 and the vertical and horizontal voltage comparators 44 and 54 may be used in conjunction with the lamps 45 and 55 to provide proper manual adjustment of the low-beam headlamp. Thus, as the headlamp adjusting operator adjusts or scans the low-beam headlamps 12 in relation to the photoreceptors or light sensitive transducers 25 through 27 and 31 through 33 by turning the adjusting screws 69 and 72, the lamps 45 and 55 will turn on when the minimum value of the contrast factor, C, is reached a second time. This is accomplished by the horizontal and vertical voltage comparators which store the minimum values found by the minimum voltage detectors 43 and 53 from the output of the contrast computer amplifiers 41 and 51. The horizontal and vertical voltage comparators 44 and 54 store these minimum values and will light the lamps 45 and 55 when the minimum values again appear as the headlamp adjusting operator adjusts the headlamps through the turning of the adjusting screws 69 and 72. In order to adjust these lamps properly, the high intensity zone 15 should be scanned over the light sensitive transducers or photoreceptors 25, 26 and 27 and 31, 32 and 33 by turning the adjusting screws 69 and 72 in one direction and subsequently reversing them.

It can be appreciated also that the servo units 46 and 56 may be employed to properly adjust the high intensity zone 15 of the low-beam headlamp 12. The servo units include means for scanning across the horizontal light sensitive devices or photoreceptors 25 through 27 and the vertical light sensitive devices or photoreceptors 31 through 33 by turning the adjusting screws 69 and 72 from one extreme position to another extreme position. The servo units 46 and 56 then reverse so that the minimum values of the contrast factor, C, as stored in the voltage comparators 44 and 54 as previously discussed, can again be reached. When these minimum values are reached, the voltage comparators 44 and 54 will stop the servo units 46 and 56 thereby stopping the adjusting tools 47 and 57. When this happens, the high intensity zone 15 of the low-beam headlamps 12 will be in a properly adjusted position with the upper edge positioned along the line 14 as shown in FIGURES 1 through 3, and the left-hand edge positioned along the line 22 as shown in these figures.

The present invention thus provides an accurate and time saving system and method for aiming properly the headlamp of an automotive vehicle. It takes the operator only a fraction of the time to aim the headlamps by the method of the invention than by the visual aiming method, since he is observing certain instruments or lights in a case where the servo units are not employed, or in a case in which the servo units are employed, the adjustment is done automatically.

It is to be understood that this invention is not to be limited to the exact construction shown and described, but that various changes and modifications may be made without departing from the spirit and scope of the invention as defined in the appended claims.

I claim:

1. In a system for aiming in a horizontal direction the light pattern of a low-beam headlamp of an automotive vehicle, a headlamp aiming board, three phototransducers mounted on a substantially horizontal line on said headlamp aiming board, and spaced apart in accordance with a predetermined light intensity pattern within said light pattern, and means coupled to said three transducers for computing the ratio of the light intensity from said light pattern falling on the phototransducer positioned nearest the center of said light pattern when said light pattern is properly aimed to the difference in light intensity falling on the other two phototransducers, and means for indicating when said ratio is a minimum.

2. In a system for aiming in a vertical direction the light pattern of a low-beam headlamp of an automotive vehicle, a headlamp aiming board, three phototransducers mounted on a substantially vertical line on said headlamp aiming board, and means coupled to said three phototransducers for computing the ratio of the light intensity from said light pattern of the lowest phototransducer to the difference in the light intensities falling on the other two phototransducers, and means for indicating when said ratio is a minimum.

3. In an apparatus for aiming in a horizontal direction the light pattern of a low-beam headlamp of an automotive vehicle the combination comprising, an automotive vehicle, a low-beam headlamp mounted in said automotive vehicle, three phototransducers mounted on a substantially horizontal line in spaced relationship to the automotive vehicle, in accordance with a predetermined light intensity pattern within said light pattern, means coupled to said low-beam headlamp and said automotive vehicle for permitting an edge of the light pattern of the low-beam headlamp to be scanned over said three phototransducers, means coupled to said three phototransducers for computing the ratio of the intensity of the light falling on the phototransducers positioned nearest light pattern when said light pattern is properly aimed to the difference in the light intensities falling on the other two transducers, and means engaging said first mentioned means and coupled to said second mentioned means for automatically adjusting the light pattern of said low-beam headlamp to bring said ratio to a minimum value.

4. In an apparatus for aiming the low-beam light pattern of an automotive vehicle headlamp in one of two mutually perpendicular directions the combination comprising, an automotive vehicle body, a headlamp mounted in said automotive vehicle body, three light sensitive devices mounted in spaced relationship to said automotive vehicle in accordance with a predetermined light intensity pattern within said light pattern on a line corresponding in direction to the direction said low-beam headlamp is to be aimed, means coupled to said automotive vehicle and to said headlamp for permitting said low-beam light pattern to be adjustably scanned over said three light sensitive devices, means coupled to said three light sensitive devices for computing the ratio of the intensity of the light falling on the light sensitive device positioned nearest the center of the low-beam light pattern when the low-beam light pattern is properly aimed to the difference in intensities falling on the other two light sensitive devices, and means coupled to said last mentioned means for indicating when said ratio is a minimum.

5. In an apparatus for aiming the low-beam light pattern of an automotive vehicle headlamp in one of two mutually perpendicular directions the combination comprising, an automotive vehicle body, a headlamp mounted in said automotive vehicle body, three light sensitive devices mounted in spaced relationship to said automotive vehicle in accordance with a predetermined light intensity pattern within said light pattern on a line corresponding in direction to the direction said low-beam headlamp is to be aimed, means coupled to said automotive vehicle and to said headlamp for permitting said low-beam light pattern to be adjustably scanned over said three light sensitive devices, means coupled to said three light sensitive devices for computing the ratio of the intensity of the light falling on the phototransducer positioned nearest the center of the low-beam light pattern when the low-beam light pattern is properly aimed to the difference in intensities of the light falling on the other two light sensitive devices, and means engaging said first mentioned means and coupled to said last mentioned means for automatically adjusting the low-beam light pattern of said headlamp to bring said ratio to a minimum value.

6. A headlamp aiming mechanism for aiming a low-beam light pattern of an automotive vehicle headlamp comprising, an aiming board for receiving light from the headlamp, a first set of three light sensitive devices positioned on said aiming board in a substantially horizontal line, a second set of three light sensitive devices positioned on said aiming board in a vertical line, said first set and said second set of light sensitive devices being positioned relative to a properly aimed high intensity zone of a low-beam light pattern and spaced apart in accordance with a predetermined light intensity pattern within said light pattern such that the outboard light sensitive device in each set relative to the high intensity zone is positioned at the edge of the high intensity zone and the remaining two light sensitive devices are located inwardly thereof, means coupled to said first set and said second set of light sensitive devices respectively for computing the ratio of the light intensity incident on the inboard light sensitive device to the difference in the intensities of the light incident on said other two light sensitive devices, and means coupled to said last mentioned means for indicating when said ratios are a minimum.

7. A headlamp aiming mechanism for aiming a low-beam light pattern from an automotive vehicle headlamp comprising, a vehicle body, a headlamp mounted in said vehicle body, an aiming board for receiving light from said headlamp, a first set of three light sensitive devices positioned on said aiming board in a substantially horizontal line, a second set of three light sensitive devices positioned on said aiming board in a vertical line, said first set and said second set of light sensitive devices being positioned relative to a properly aimed high intensity zone of the low-beam light pattern and spaced apart in accordance with a predetermined light intensity pattern within said light pattern such that the outboard light sensitive device in each set relative to the high intensity zone is positioned at the edge of the high intensity zone and the remaining two light sensitive devices are located inwardly thereof, means coupled to said vehicle body and said headlamp for permitting a horizontal edge of the high intensity zone to be adjustably scanned over said three light sensitive devices positioned on said aiming board in the vertical line and a vertical edge of the high intensity zone to be scanned over said three light sensitive devices positioned on said aiming board in the horizontal line, means coupled to said first set and said second set of light sensitive devices respectively for computing in said first set and said second set the ratios of the light intensity incident on the inboard light sensitive device in each set to the difference in the intensities of the light incident on said other two light sensitive devices in each set, and means engaging said first mentioned means and said last mentioned means for automatically adjusting the low-beam light pattern of the headlamp to bring each of said ratios to a minimum value.

8. A headlamp aiming mechanism for aiming a low-beam light pattern from an automotive vehicle headlamp comprising, a vehicle body, a headlamp mounted in said vehicle body, an aiming board for receiving light from said headlamp, a first set of three light sensitive devices positioned on said aiming board in a substantially horizontal line, a second set of three light sensitive devices positioned on said aiming board in a vertical line, said first set and said second set of light sensitive devices being positioned relative to a properly aimed high intensity zone of the low-beam light pattern and spaced apart in accordance with a predetermined light intensity pattern within said light pattern such that the outboard light sensitive device in each set relative to the high intensity zone is positioned at the edge of the high intensity zone and the remaining two light sensitive devices are located inwardly thereof, means coupled to said vehicle body and said headlamp for permitting a horizontal edge of the high intensity zone to be adjustably scanned over said three light sensitive devices positioned on said aiming board in the vertical line and for permitting a vertical edge of the high intensity zone to be adjustably scanned over said three light sensitive devices positioned on said aiming board in the horizontal line, computing means coupled to said first set and said second set of light sensitive devices respectively for computing in said first set and said second set ratios of the light intensity incident on the inboard light sensitive device in each set to the difference in the intensities of the light incident on said other two light sensitive devices in each set, a minimum voltage detector coupled to each computing means, a voltage comparator coupled to each minimum voltage detector, and a servo unit coupled to each voltage comparator, said servo units including an adjusting tool engaging said first mentioned means and including means for scanning in one direction the vertical edge of said high intensity zone over said three light sensitive devices positioned on said aiming board in the horizontal line and for scanning in one direction the horizontal edge of the high intensity zone over said three light sensitive devices positioned on said aiming board in the vertical line, said horizontal voltage comparators including means for storing the minimum value of said ratios as detected by said minimum voltage detectors during said scanning, said servo units including means for reversing said scanning to cause said sets of three light sensitive devices to be scanned in the other direction, said voltage comparators including means for stopping said servo units when said ratios computed by said computing means and detected by said minimum voltage detectors again reach the minimum values as stored in said voltage comparators.

9. A method of aiming the low-beam light pattern of an adjustable automotive vehicle headlamp comprising, focusing the low-beam light pattern on an aiming board having three light sensitive devices mounted thereon on a substantially straight line adjacent to and substantially perpendicular to the edge of and within the high intensity zone of a properly aimed low-beam headlamp light pattern, and spaced apart in accordance with a predetermined light intensity pattern within said zone, feeding the output of said three light sensitive devices to a ratio computer, and adjusting the adjustable automotive headlamp until the ratio of the intensity of the light incident on the light sensitive device nearest the center of the high intensity zone when said headlamp is properly aimed to the difference in the intensities of the light falling on the other two light sensitive devices is a minimum as computed by said ratio computer.

10. A method of aiming the low-beam light pattern of an adjustable automotive vehicle headlamp comprising, focusing the low-beam light pattern on an aiming board having three light sensitive devices spaced apart in accordance with a predetermined light intensity pattern within said light pattern and mounted thereon in a substantially vertical line adjacent to and substantially perpendicular to a horizontal edge of the high intensity zone of a properly aimed low-beam headlamp light pattern and having three light sensitive devices spaced apart in accordance with a predetermined light intensity pattern within said light pattern and mounted thereon on a substantially horizontal line adjacent to and substantially perpendicular to a vertical edge of the high intensity zone of a properly aimed low-beam headlamp light pattern, feeding the output of said first three light sensitive devices and the output of said second three light sensitive devices to a first and a second ratio computer respectively, and adjusting the adjustable automotive headlamp until the ratio of the light intensities incident on the light sensitive device nearest the center of the high intensity zone of said light pattern when said headlamp is properly aimed to the difference in the intensities of the light falling on the other two light sensitive devices is a minimum as computed by said first and said second ratio computers for said first three light sensitive devices and for said second three light sensitive devices.

No references cited.

JEWELL H. PEDERSEN, *Primary Examiner.*

A. A. KASHINSKI, *Assistant Examiner.*